United States Patent [19]
Boots

[11] Patent Number: 4,757,643
[45] Date of Patent: Jul. 19, 1988

[54] ELASTIC SEAL FOR A DISPLACEABLE PANEL OF AN OPEN ROOF CONSTRUCTION FOR A VEHICLE

[75] Inventor: Robert T. Boots, GZ Haarlem, Netherlands

[73] Assignee: Vermeulen-Hollandia Octrooien II B.V., Netherlands

[21] Appl. No.: 922,167

[22] Filed: Oct. 23, 1986

[30] Foreign Application Priority Data

Nov. 26, 1985 [NL] Netherlands ............... 8503254

[51] Int. Cl.$^4$ ............................................. E06B 7/16
[52] U.S. Cl. .................................. 49/488; 49/490
[58] Field of Search ............ 49/488, 489, 490, 491, 49/498; 296/93

[56] References Cited

U.S. PATENT DOCUMENTS

| | | | |
|---|---|---|---|
| 2,877,518 | 3/1959 | Wondisford | 49/498 |
| 2,935,771 | 5/1960 | Hatcher | 49/489 |
| 4,477,507 | 10/1984 | Kunert | 49/498 |

FOREIGN PATENT DOCUMENTS

| | | | |
|---|---|---|---|
| 152419 | 9/1951 | Australia | 296/93 |
| 0213248 | 1/1961 | Austria | 49/490 |
| 0830143 | 3/1960 | United Kingdom | 49/491 |

*Primary Examiner*—Kenneth J. Dorner
*Assistant Examiner*—Gerald A. Anderson
*Attorney, Agent, or Firm*—Kinney & Lange

[57] ABSTRACT

An elastic seal for a displaceable panel of an open roof construction for a vehicle comprises a mounting section and a hollow sealing section made of rubber. The mounting section is adapted to be disposed along the periphery of the panel. The sealing section is arranged outwardly of said mounting section. The mounting section is provided with outwardly extending flanges, which engage the upper or lower side respectively of the sealing section. In the bended condition of the seal these flanges have been displaced inwardly towards each other with respect to the non-bended condition thereby pinching the sealing section together in a direction perpendicular to the plane of bending.

Herein a substantially constant distance between the outer border of the sealing section and the mounting section is maintained under all circumstances.

8 Claims, 1 Drawing Sheet

ELASTIC SEAL FOR A DISPLACEABLE PANEL OF AN OPEN ROOF CONSTRUCTION FOR A VEHICLE

The invention relates to an elastic seal for a displaceable panel of an open roof construction for a vehicle, comprising a mounting section adapted to be disposed along the periphery of the panel and a hollow sealing section made of rubber or like material arranged outwardly of said mounting section.

In a known seal of this kind the mounting section and the sealing section are fixed to each other in a bended configuration, which corresponds to that of the periphery of the panel, so as to eliminate tensile stress between the mounting section and the sealing section resulting from the bending. In the outer border of the sealing section, however, a tensile stress still occurs as a consequence of the distance from the outer border to the neutral bending line of the sealing section. Hereby the sealing section contracts slightly in the plane of bending at the corners of the panel, whereby the sealing action of the sealing section suffers from shortcomings at the corners of the panel.

It is an object of the invention to provide an elastic seal of the kind mentioned in the preamble, wherein this disadvantage is removed in an effective way.

For this purpose the seal according to the invention is characterized in that the mounting section and the sealing section are coupled in such a way, that the mounting section exerts a force upon the sealing section so as to maintain a substantially constant distance between the outer border of the sealing section and the mounting section under all circumstances.

By said influence of the mounting section upon the sealing section the contraction of the sealing section at the corners of the panel is compensated, whereby the sealing section offers an optimal sealing action also in said corners.

In an advantageous embodiment of the seal according to the invention the mounting section pinches the sealing section together in a direction perpendicular to the plane of bending in the bended condition of the seal.

Hereby it is attained in a very simple way, that the outer border of the sealing section is maintained at a constant distance to the mounting section and consequently the contraction of the sealing section is compensated.

A favourable embodiment of the seal according to the invention, wherein this pinching together is attained, is characterized in that the mounting section engages around a portion of the sealing section. Herein it is advantageously, when the mounting section is provided with outwardly extending flanges, which engage the upper or lower side respectively of the sealing section, wherein in the bended condition of the mounting section the flanges have been displaced inwardly toward each other with respect to the non-bended condition.

The invention will hereafter be elucidated with reference to the drawing, which shows an embodiment of the seal according to the invention by way of example.

Figure 1:
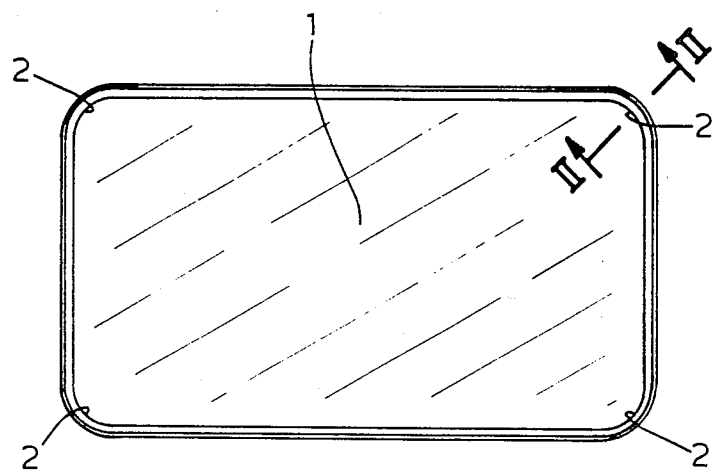
FIG. 1 is a plan view of a panel of an open roof construction provided with an elastic seal according to the invention.

The drawing shows an embodiment of the elastic seal for a displaceable panel 1 of an open roof construction for a vehicle. The panel 1 has a rectangular configuration with four rounded corners 2. A metal frame 3 is disposed at the lower side of the panel 1 along the whole periphery thereof, the frame 3 projecting outwardly out of the panel 1. The outer border 4 of the frame 3 is directed upwardly substantially perpendicular to the plane of the panel 1 and serves as carrier for an elastic mounting section 5.

The mounting section 5 is clamped around the frame 3, wherein the border 4 of the frame 3 is accommodated in a channel 6 of the mounting section 5, and a flange 7 of the mounting section 5 is supported on the panel 1 in a sealing relationship, and the flange 8 of the mounting section 5 is clamped against the lower side of the frame 3.

At the side facing away from the panel 1 the mounting section 5 is provided with a flange 9, 10 respectively formed at the lower or upper side respectively thereof and extending in the outward direction. The flanges 9 and 10 have such configuration, that they define a dovetailed groove 11 together with the web of the mounting section 5.

In the dovetailed groove 11 a slightly flaring portion 12 of a hollow sealing section 13 is fittingly accommodated. This sealing section 13 is provided with sealing means, such as nylon fibres 14 or the like at the side facing away from the panel 1.

Figure 2:
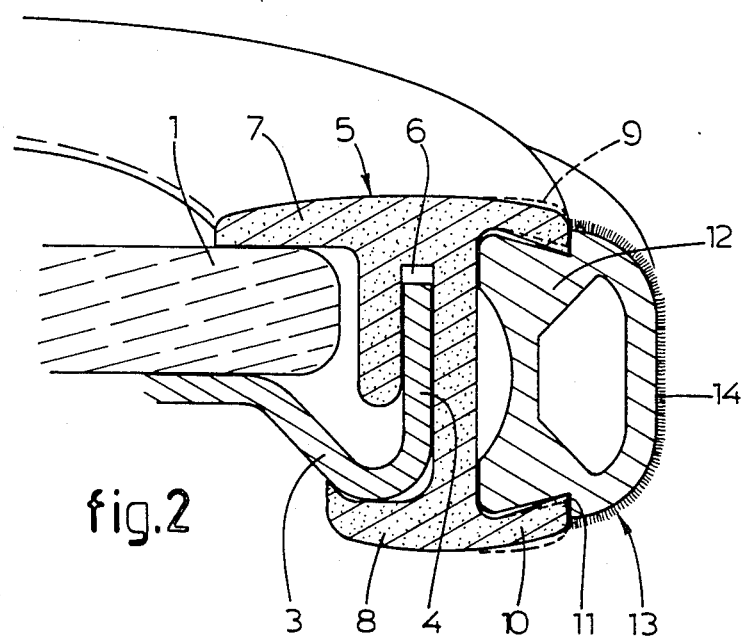
FIG. 2 is an enlarged section along the line II—II in FIG. 1, illustrating the structure of the elastic seal.

In the non-bended condition of the elastic seal the flanges 9 and 10 of the mounting section 5 have the configuration as indicated with dashed lines in FIG. 2. When the mounting section 5 is bended around the panel 1 the flanges 9 and 10 are urged inwardly towards each other in the corners 2 of the panel 1. This is caused by the tensile stress resulting from bending the mounting section 5, the tensile stress deforming the flanges 9 and 10, which are already slightly inclined, further towards each other. Hereby the dovetailed groove 11 is narrower in the corners 2 than at the straight sides of the panel 1 in the condition in which the mounting section 5 is mounted to the panel 1. Since the mounting section 5 is made of a material that is harder than that of the sealing section 13 the sealing section 13 disposed in the groove 11 will be pinched together to a greater extent in the corners 2 of the panel 1 than at the straight sides of the panel 1, so that the outer border of the sealing section 13 provided with the nylon fibres 14 is urged outwardly. Consequently the contraction of the sealing section 13 resulting from the bending is compensated. In this way an optimal sealing action of the elastic seal is accomplished along the whole periphery of the panel 1.

In practice first of all the mounting section 5 will be mounted around the panel 1 before the sealing section 13 is placed into the groove 11 of the mounting section 5. Hereby a stress between the mounting section 5 and the sealing section 13 resulting from the friction between said sections when the whole seal is bent is prevented.

The invention is not restricted to the embodiments shown in the drawing by way of example, which can be varied in several ways within the scope of the invention.

I claim:

1. An elastic seal for a displacement panel of an open roof construction for a vehicle, the panel having a plurality of rounded corners portions with side portions therebetween, comprising a mounting section
    disposed along the periphery of the panel and a hollow sealing section made of elastic material arranged outwardly of the said mounting section, the sealing section having an outer border, wherein the mounting section has a pair of spaced flanges which taper toward each other at outer ends and which receive the sealing section, the outer ends of the flanges of the mounting section are moved together when the mounting section is bent to conform to the rounded corner portions of the panel so the flanges exert a force upon the sealing section around the corner portions to move the outer border away from the mounting section more than at the side portions of the panel so as to maintain a substantially constant distance between the outer border of the sealing section and the mounting section throughout the entire periphery.

2. A seal as claimed in claim 1, wherein the mounting section is made of a material which is harder than that of the sealing section.

3. An elastic seal for a displaceable panel of an open roof construction for a vehicle, the panel having a periphery consisting of four sides connected to each other through corners, the elastic seal comprising:
a mounting section adapted to be disposed along the periphery of the panel;
a hollow sealing section made of rubber or like material arranged outwardly of said mounting section and having an outer border forming an operative part of the sealing section; and
means in the mounting section and the sealing section for deforming the sealing section in the corners of the panel more than at the sides thereof as the mounting section is formed around the corners of the panel so as to maintain a substantially constant distance between the outer border of the sealing section and the mounting section along the whole periphery of the panel.

4. A seal as claimed in claim 3 wherein at the corners of the panel the mounting section is bent around the corners and is deformed in such a way with respect to its non-bent condition at the sides of the panel that the mounting section pinches the sealing section together in a direction perpendicular to the plane of bending.

5. A seal as claimed in claim 4 wherein the mounting section engages around a portion of the sealing section.

6. A seal as claimed in claim 5 wherein the mounting section is provided with outwardly extending flanges which taper inwardly at their outer ends and engage first and second sides respectively of the sealing section, wherein in the bent condition of the mounting section the flanges have been displaced inwardly towards each other a greater amount than with respect to the non-bent condition.

7. A seal as claimed in claim 6 wherein the flanges of the mounting section together with a web portion thereof form a dovetailed groove in which the sealing section is received.

8. A seal as claimed in claim 3 wherein the mounting section is made of a material which is harder than that of the sealing section.

* * * * *